O. SUNDQUIST.
TOURING ACCESSORY FOR AUTOMOBILES.
APPLICATION FILED FEB. 17, 1917.

1,241,449.

Patented Sept. 25, 1917.
2 SHEETS—SHEET 1.

WITNESSES

INVENTOR
O. Sundquist,
BY Victor J. Evans
ATTORNEY

O. SUNDQUIST.
TOURING ACCESSORY FOR AUTOMOBILES.
APPLICATION FILED FEB. 17, 1917.
1,241,449.
Patented Sept. 25, 1917.
2 SHEETS—SHEET 2.
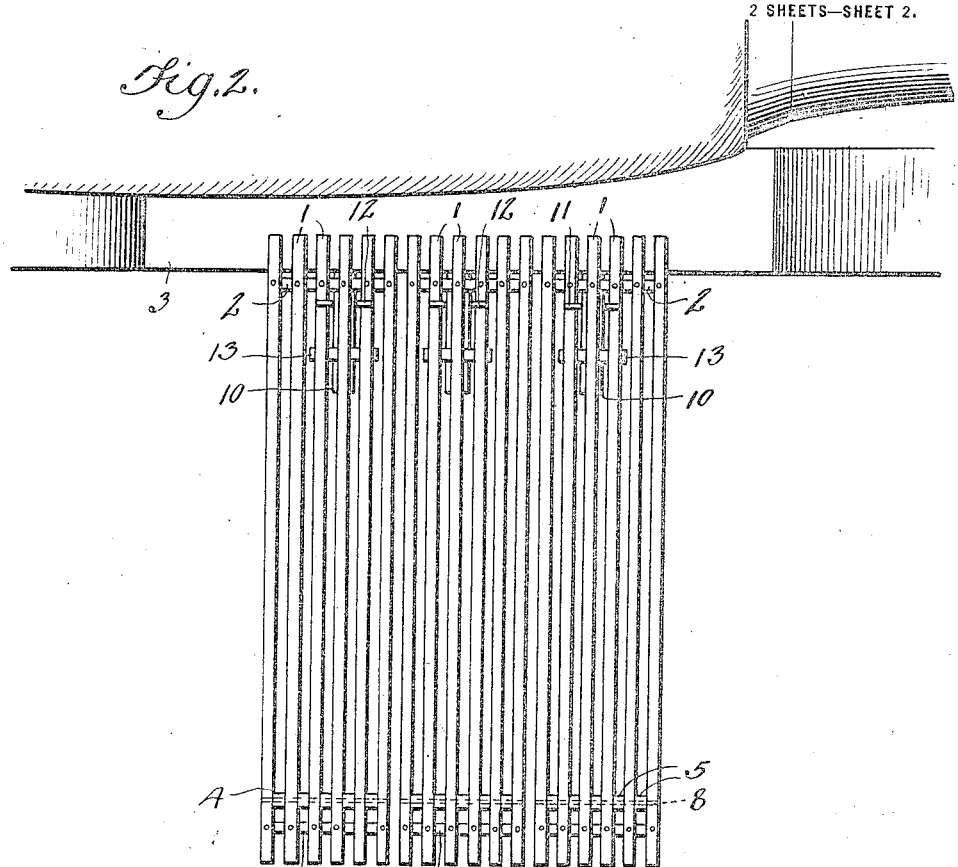
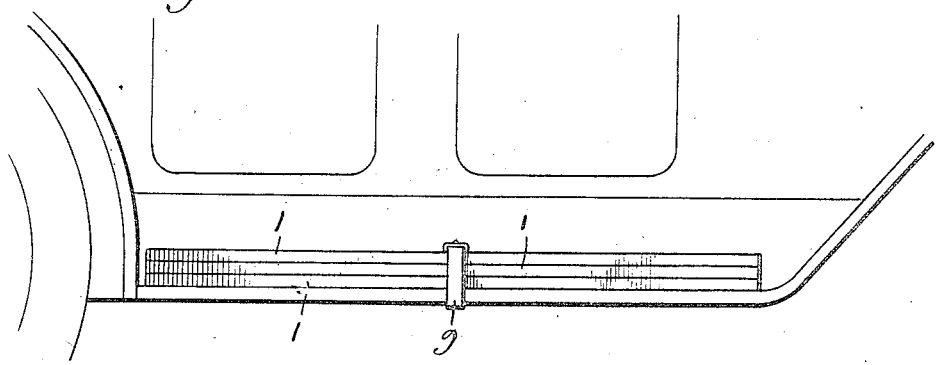
WITNESSES
INVENTOR
O. Sundquist,
BY Victor J. Evans
ATTORNEY

UNITED STATES PATENT OFFICE.

OLOF SUNDQUIST, OF PUEBLO, COLORADO.

TOURING ACCESSORY FOR AUTOMOBILES.

1,241,449.

Specification of Letters Patent. Patented Sept. 25, 1917.

Application filed February 17, 1917. Serial No. 149,298.

*To all whom it may concern:*

Be it known that I, OLOF SUNDQUIST, a citizen of the United States, residing at Pueblo, in the county of Pueblo and State of Colorado, have invented new and useful Improvements in Touring Accessories for Automobiles, of which the following is a specification.

This invention relates to touring accessories for automobiles, the object in view being to produce a convenient accessory adapted to be folded compactly and carried upon an automobile, occupying a space not otherwise utilized, and not interfering in the slightest with persons entering or descending from the vehicle. The accessory comprises several members or elements of a similar character, which are adapted to be set up in position to afford convenient benches for the touring party and a bench or table upon which a meal may be spread. Under another use of the invention, the several benches may be arranged close together so as to form a stationary and commodious bed. Each of the members comprises means for clamping the same in fixed relation to either running board of the automobile so that all of the members may be held securely in fixed relation to the vehicle while being used.

With the above and other objects in view, the invention consists in the novel construction, combination and arrangement of parts, herein described, illustrated and claimed.

In the accompanying drawings:—

Fig. 2 is a plan view showing the benches arranged to form a bed.

Fig. 3 is a fragmentary side elevation of the automobile showing the benches in their carrying positions.

Figure 1:
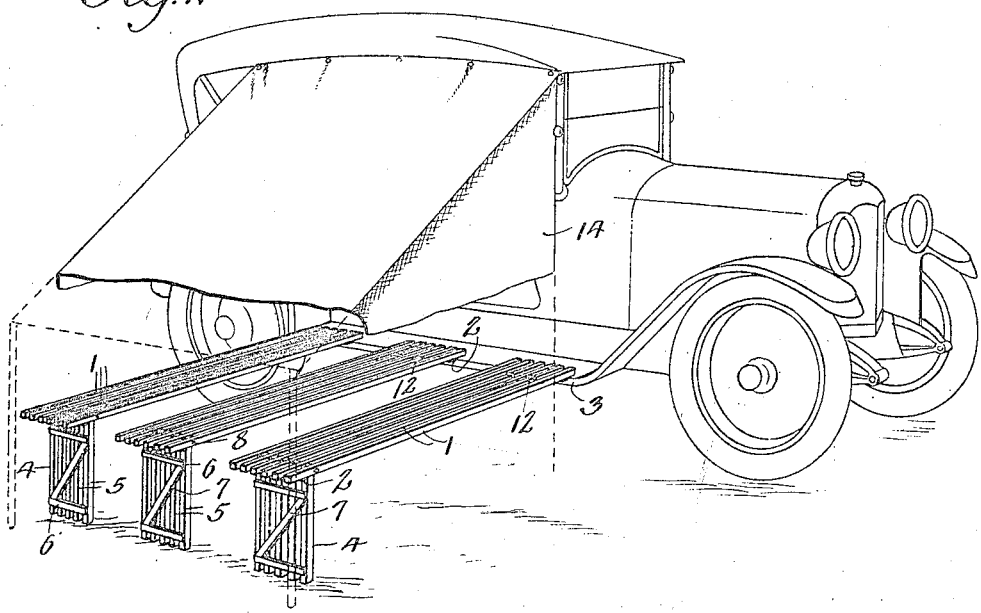
Figure 1 is a perspective view of the complete accessory shown applied to an automobile and arranged to afford a table and seats at each side thereof, also showing the cover in its useful position.

In order to provide a complete and convenient equipment, three benches are employed and each bench is composed of parallel slats 1 securely and fixedly connected together by means of cleats or tie straps 2 riveted or otherwise secured to the slats 1. The inner end of each bench is adapted to be supported by the running board 3 of an automobile. The outer end of each bench is upheld by means of a foldable support or leg 4, the same being also of slatted formation and the slats being so arranged as to lie between the slats 1 when the support 4 is folded into the same plane therewith.

The support 4, in addition to the parallel slats 5, embodies cross cleats or ties 6 and also one or more diagonal braces or ties 7, the members 6 and 7 being riveted or otherwise secured to the slats 5. A hinge pin 8 is driven through the slats 1 and also through the end portions of the slats 5 to form a hinged connection between the support 4 and the main body of the bench.

When the benches are folded and placed upon the running board as shown in Fig. 3, they are fastened in place by one or more leather straps 9 or the equivalent thereof. The folded benches lie flat-wise upon the running board 3 with their inner edges against the body or running board apron so that a single strap 9 will answer to prevent any shifting movement whatever of the folded benches. The benches when in the position shown in Fig. 3, may be stepped upon and they do not therefore interfere in the slightest with persons entering and leaving the vehicle.

Figure 4:
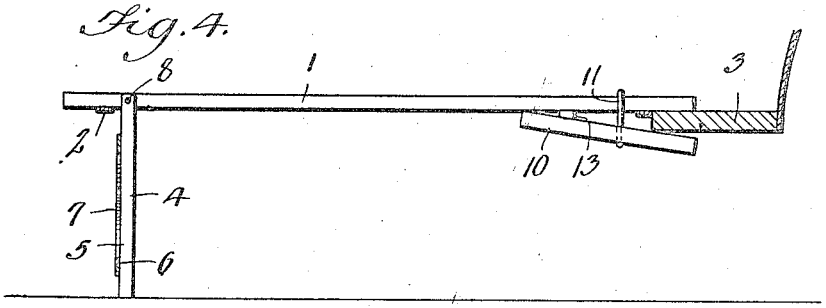
Fig. 4 is a section taken longitudinally of one of the benches, showing the clamping means for fastening the same to the running board.
Figure 6:
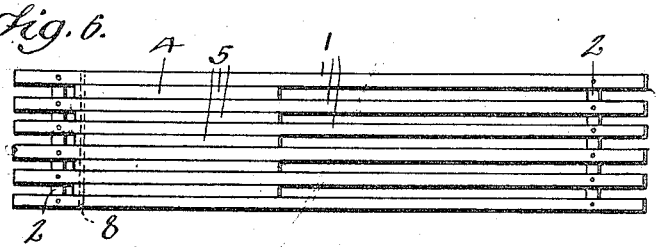
Fig. 6 is a plan view of one of the benches in its fully folded condition.
Figure 5:
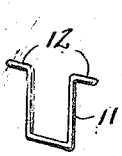
Fig. 5 is a detail perspective view of one of the clamp holding loops.

Each of the benches is equipped with clamping means for securing the otherwise unsupported end thereof in fixed relation to the running board 3. This clamping means comprises a clamping bar or lever 10 and a bail shaped keeper or hanger 11 for said clamping member. The keeper or hanger 11 is substantially U-shaped or three sided as shown in Fig. 5 and the upper extremities thereof are extended outwardly at right angles and away from each other to form supporting fingers or ends 12 adapted to rest upon the upper surfaces of two adjacent slats 1. The clamping member 10 passes through the hanger 11 below the respective bench and while the adjacent end of the bench is adapted to rest upon the running board 3, the corresponding end of the clamping member 10 is designed to extend under the running board as shown in Fig. 4. One or more wedges 13 may be driven between the clamping members 10 and the benches as indicated in Fig. 4 to make the clamping action more effective. When the bench is detached from the running board, each clamping member 10 is withdrawn from its respective hanger 11 and the latter is then given a quarter turn and removed from between the slats with which it has previously been in engagement. The clamping members 10 and their hangers 11 are sufficiently small to enable them to be compactly stored in a compartment of the vehicle.

The benches may be secured to the running board in spaced relation to each other so as to provide what may be termed a table and seats or benches at the opposite sides thereof. For sleeping purposes, the benches may be arranged close together so as to receive a mattress or a blanket and they will form a bed of sufficient width to enable two persons to comfortably recline thereon.

In case of rain, snow or the like, a tent-like cover 14 is provided, the same being adapted to be placed over the benches or buttoned or otherwise secured at the top to the vehicle or the top thereof, said cover being of sufficient extent and capacity to entirely cover the benches whether arranged for eating or sleeping purposes. The device as a whole takes up no otherwise valuable space, does not interfere with persons entering and leaving the vehicle and will be found of great convenience to campers, tourists and others.

I claim:—

An automobile accessory consisting of a bench composed of parallel slats secured in fixed but spaced relation to each other and forming a bench of substantially the same width as the running board of an automobile and adapted to be placed flat-wise upon and carried by such running board, a slatted and foldable support having a pivotal connection with said bench adjacent to one end thereof and adapted to lie between the slats of the bench when folded, clamping means for securing the opposite end of the bench to said running board, said clamping means comprising a substantially U-shaped hanger having oppositely extending extremities and adapted to be inserted between adjacent slats of the bench, and a clamping bar extending through said hanger and located beneath the bench in position to engage the running board and hold the latter securely clamped against the under-side of the bench.

In testimony whereof I affix my signature.

OLOF SUNDQUIST.